United States Patent

MacKeigan

[15] 3,685,160
[45] Aug. 22, 1972

[54] BRAKE SHOE CLEARANCE GAGE

[72] Inventor: Thomas H. MacKeigan, Windsor, Ontario, Canada

[73] Assignee: Abex Corporation, New York, N.Y.

[22] Filed: Aug. 5, 1970

[21] Appl. No.: 61,303

[52] U.S. Cl..................33/181 AT, 33/171, 33/172 R
[51] Int. Cl................................................G01b 5/14
[58] Field of Search.33/180 AT, 181 AT, 172 R, 171

[56] References Cited

UNITED STATES PATENTS

| | | | |
|---|---|---|---|
| 2,087,497 | 7/1937 | Blackman | 33/180 AT |
| 3,241,244 | 3/1966 | Jones | 33/180 AT |
| 3,073,035 | 1/1963 | Thomason | 33/180 AT |
| 2,268,171 | 12/1941 | Sikora | 33/180 AT |
| 1,965,843 | 7/1934 | Kuhle | 33/180 AT |

*Primary Examiner*—William D. Martin, Jr.
*Attorney*—Frank H. Foster and James R. Cox

[57] ABSTRACT

A brake lining gage is disclosed for supporting a brake shoe in a test plane to measure the clearance or interference between various points on the lining and a simulated standard brake drum. The gage has a base on which parts of a brake mechanism are adjustably simulated. A center post mounted on the base simulates the center of a standard brake drum. Various size anchor pins are movably mountable individually on the base for radial adjustment. An outside diameter locater post is similarly movably mounted to the base for radial adjustment. A series of arcuately spaced radial slots are provided in the base in adjacent quadrants on each side of the outside diameter locater post for slidably receiving radially adjustable distance indicating meters having radially operable sensing members. The anchor pin, the outside diameter locater post, and the meters are accurately adjusted into position with reference to the center post by means of setting bars which seat at one end against the center post and are radially aligned toward the piece being adjusted. A set of several such setting bars is provided corresponding to various standard brake mechanism dimensions.

8 Claims, 6 Drawing Figures

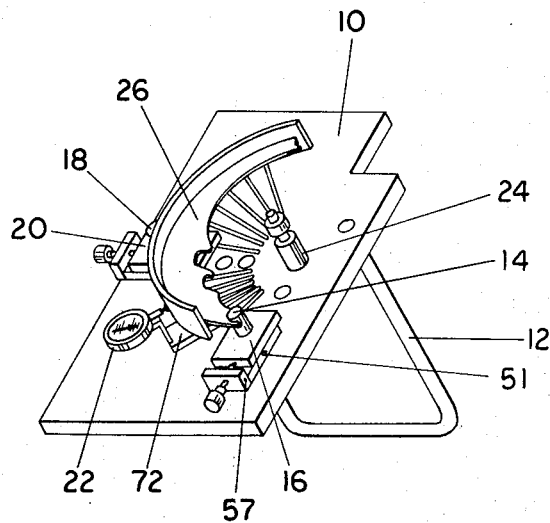
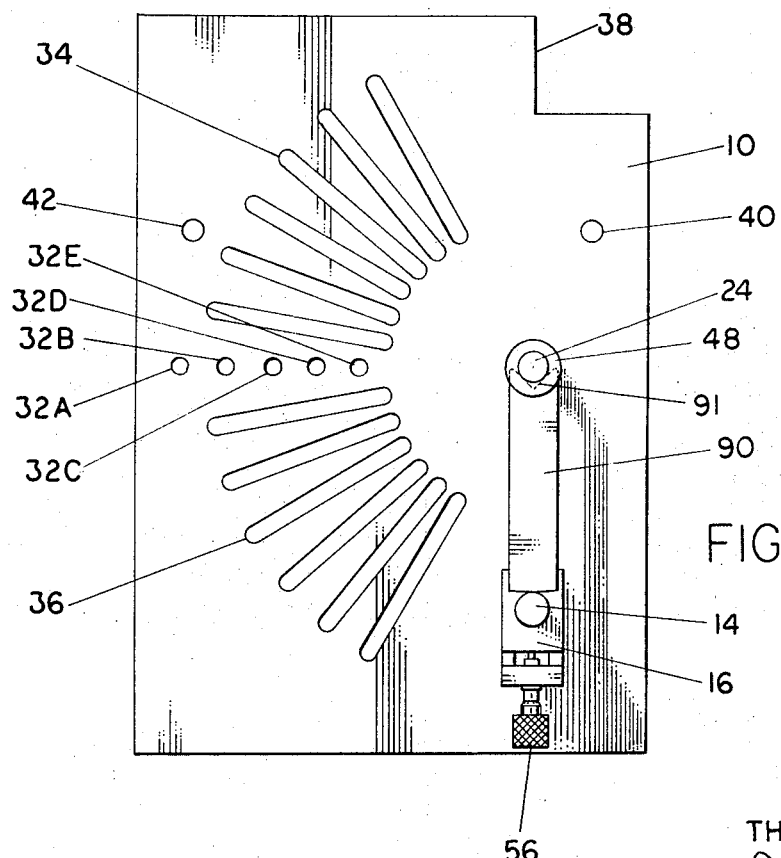

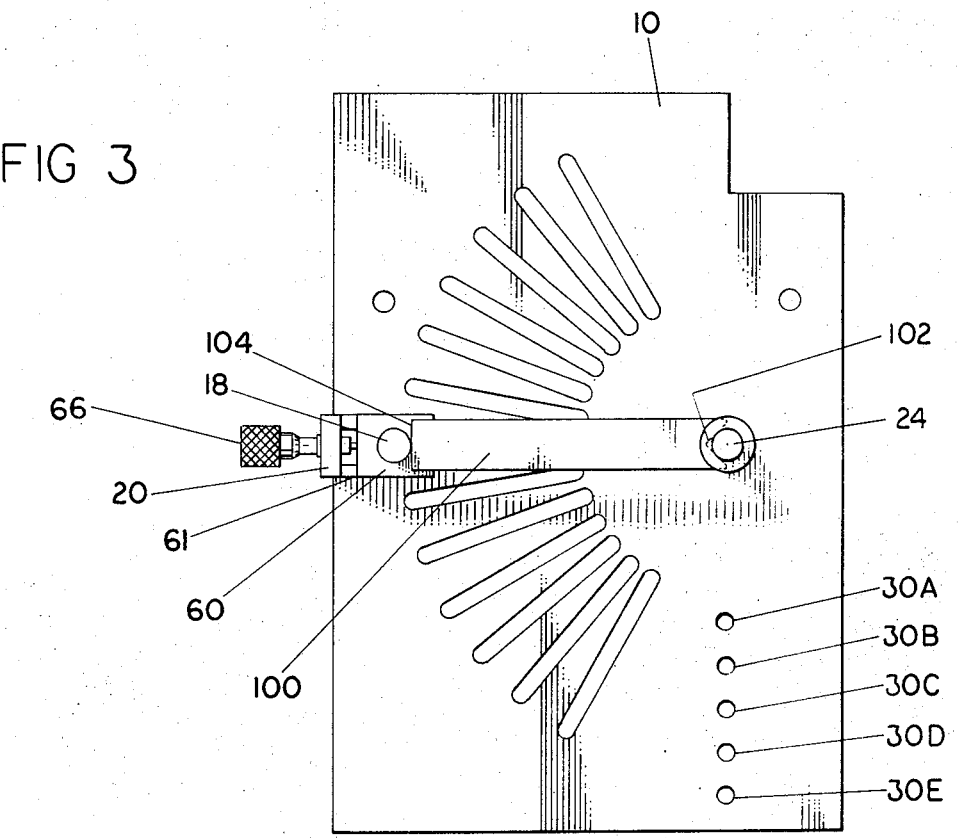
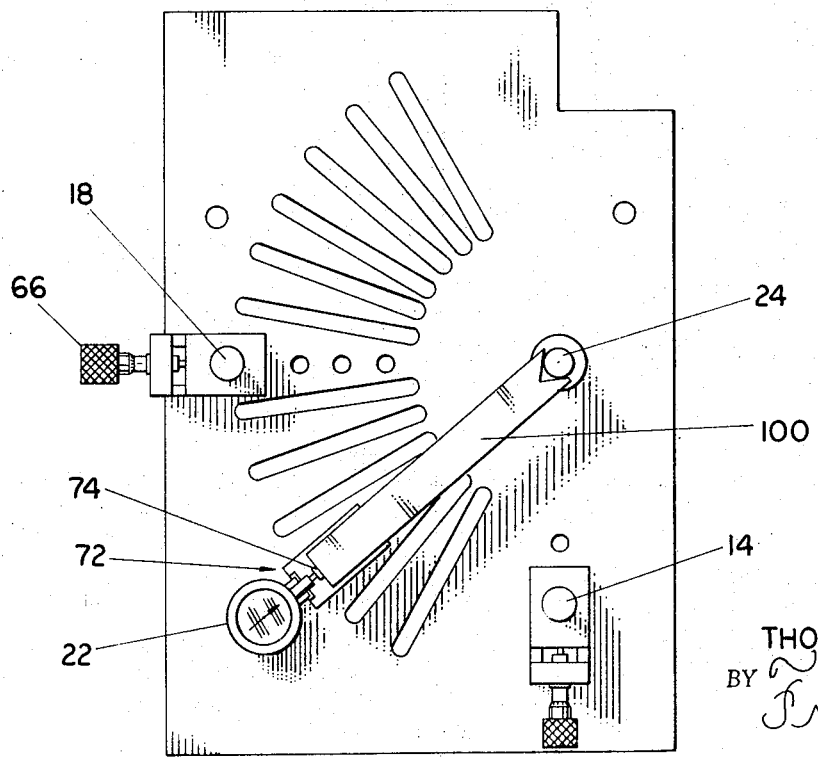

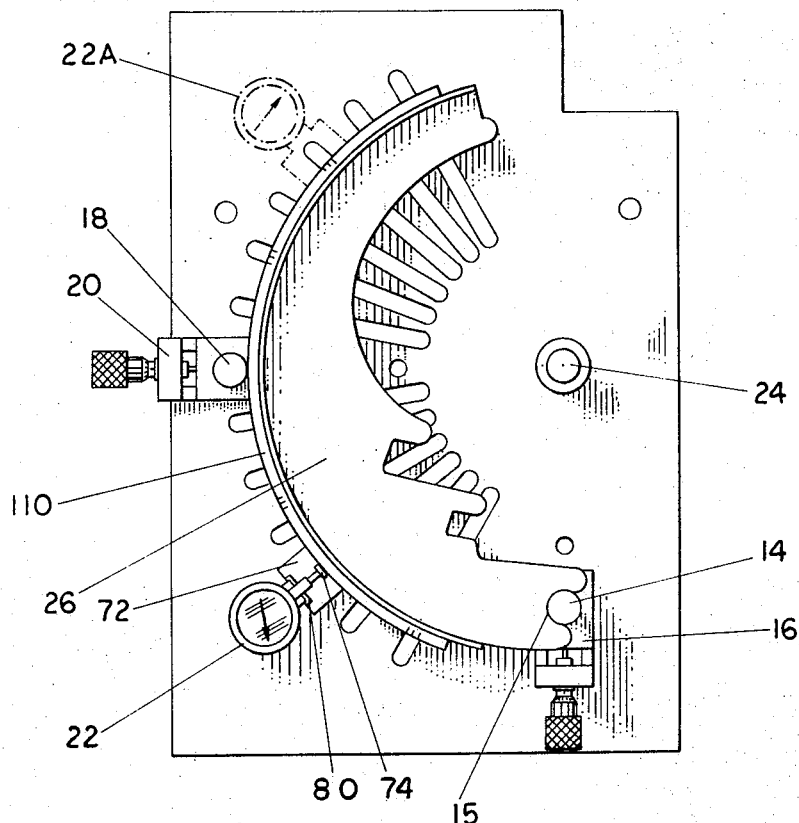
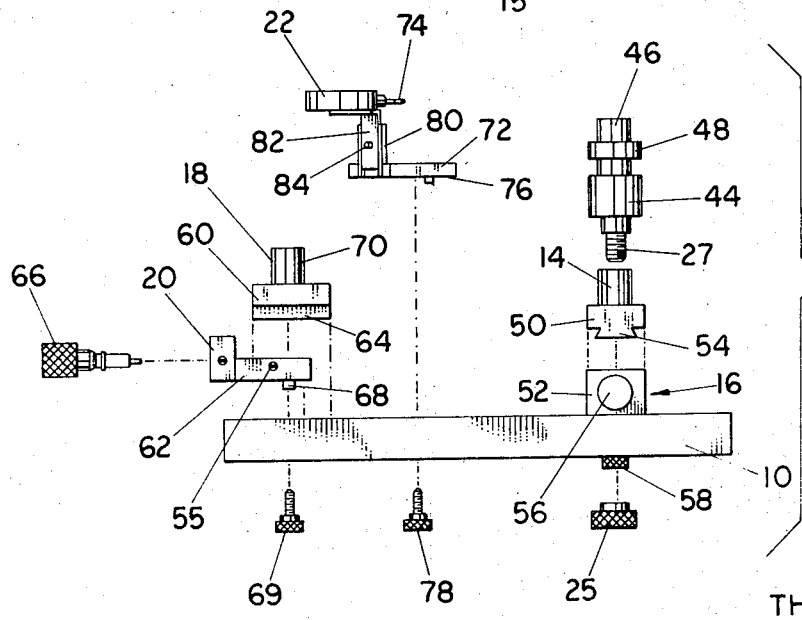

BRAKE SHOE CLEARANCE GAGE

BACKGROUND OF THE INVENTION

This relates to measuring fixtures for measuring critical dimensions of an object and more particularly relates to a gage for measuring the prospective clearance or interference between a lined brake shoe and its mating drum at various arcuately spaced points along the brake lining.

A conventional drum-type brake mechanism has a rotatable drum with a cylindrical interior and a pair of non-rotating shoes which are pivotally mounted within the drum and have linings mounted on their exteriors. The exterior surface of the lining on each shoe is arcuately formed for frictional engagement with the drum. The arcuate surface of each shoe lining is formed with a radius slightly less than the drum radius with the result that the normal shoe lining initially contacts the drum centrally at a single line. The remaining shoe lining surface at initial contact will be spaced from the drum. This clearance will, with an unworn shoe lining, be progressively greater at further distances from the central line of initial contact. A distorted shoe or improperly shaped lining may make its initial contact at a position other than the intended initial contact position. This interference can result in improper operation of the brake mechanism.

It follows that it is not only desirable to measure such clearance or interference but also it is desirable to make these measurements on a machine or work bench before the shoe is installed in the brake mechanism. This is particularly advantageous where brake shoe linings are being ground to desired dimensions to operate with a particular brake drum.

Diverse devices have been proposed and used for measuring clearance and interference either of the assembled brake mechanism or of an unassembled shoe. For example, devices are shown in the U.S. Pats. to Kuhle No. 1,965,843; Thomason No. 3,073,035; Comstock No. 2,593,986; and Wasley No. 3,139,685.

There is a need for a device which can provide measurement with improved accuracy. One basis for the impaired accuracy of these prior devices is that, generally, they do not establish a fixed point for simulating the initial contact point of the drum with the shoe lining. A gage is needed which establishes such a fixed initial contact point and which then permits measurements at angular intervals on opposite sides of the initial contact point.

There is also a need for a device which establishes a fixed drum center point. This need arises because in an actual brake mechanism, the center point is the manufacturing reference point. Yet, many prior art devices utilize the anchor pin or the drum as the reference point of measurements and consequently may introduce error into the measurements due to a deviation in the anchor pin position or drum position relative to the center point.

Some of the previous devices, such as the Thomason device, require the use of an actual brake drum. Thus to permit measurement of various sized shoes several different sized drums are needed. There is therefore a need for a device which does not require the use of actual drums. Furthermore, there is a need for a device which can simulate the anchor pin and the brake drum and which can also permit the anchor pin position and the brake drum position to be independently adjusted to an unlimited number of positions within a useful range.

SUMMARY OF THE INVENTION

The invention is a brake lining gage for supporting a brake shoe in a test plane for measurement of clearances and interferences between a simulated standard brake drum and the lining of the shoe. The gage has a base with several structures mounted to it. An anchor pin is mounted to the base and extends through and perpendicular to the test plane for seating against the anchor eye of the brake shoe at a position simulating the anchor pin of a brake mechanism. An outside diameter locater means is also mounted to the base, the locater means having a locating surface extending through the test plane for seating against the lining at a position simulating and corresponding to a standard initial contact point for the shoe lining and the drum. At least one distance indicating meter is mounted to the base radially outwardly from the center of the simulated drum and having a radially operable sensing member seatable against the shoe lining for indicating the radial distance from a simulated drum to the shoe liner. The meter is calibrated to the standard drum radius, a brake shoe is then positioned on the gage with its anchor eye seated against the anchor pin and its lining seated against the locater means, and the meter sensing member will then indicate the clearance or interference between the drum and the shoe lining.

The gage also includes a center post mounted to the base extending through and perpendicular to the test plane and spaced from the anchor pin at a position simulating the center of the standard brake drum. A set of drum radius setting bars and a set of anchor pin setting bars are provided. Each bar has an effective length corresponding to specific brake mechanism dimensions and is used to accurately position the anchor pin, the locater means, and the meter the proper distance from the center post.

An object of the invention is to provide for the measurement of the lining, ground on a brake shoe, to permit accurate control of the lining surface so that it will make the desired contact with the drum and have the proper clearance on opposite sides of the initial contact point.

A further object is to provide a gage which establishes a fixed point for simulating the initial contact point of the shoe lining with the drum and also a fixed drum center point from which measurements are made.

Another object of the invention is to provide an inexpensive, easily assembled and easily used gage.

Another object is to provide a gage which can alternatively measure the clearance or interference of a brake shoe without the necessity of mounting the shoe in a brake drum.

Yet another object of the invention is to provide a gage which can measure the clearance or interference between a brake shoe and a non-standard brake drum.

Another object of the invention is to provide a gage which measures the clearance or interference for the shoe in its engaged position against the drum rather than in its disengaged position.

Another object of the invention is to provide a gage which can be used to measure the effect of a dimensional change of one brake component on another and also can be used to measure the clearance change of a standard shoe in an oversize drum.

Another object of the invention is to provide a gage which is not confined to measurements at a single point on the shoe lining, but rather can make several measurements at various selected positions across the width of the lining.

Further objects and features of the invention will be apparent from the following specification and claims when considered in connection with the accompanying drawings illustrating several embodiments of my invention.

DESCRIPTION OF THE DRAWINGS

FIG. 1 is a view in perspective of a brake shoe clearance gage made according to the invention showing a brake shoe mounted in position on the gage;

FIG. 2 is a plan view of the base plate of the embodiment illustrated in FIG. 1, illustrating the positioning of the anchor pin;

FIG. 3 is a plan view of the base plate illustrated in FIG. 1 showing the positioning of the brake drum locater means;

FIG. 4 is a plan view of the base plate of FIG. 1 illustrating the calibration of the distance indicating meter;

FIG. 5 is a plan view of the base plate of FIG. 1 showing a brake shoe in proper position on the gage for measurement; and FIG. 6 is an exploded front elevation of the gage illustrated in FIG. 5 showing the apparatus mounted thereon exploded.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

An assembled brake shoe clearance gage made according to the invention is illustrated in FIG. 1. Described generally, the gage has a flat base plate 10 beneath which a supporting leg structure 12 is connected so that the base plate 10 may be set on a work table and held in an oblique or vertical position transverse to the work table. Mounted to a lower portion of the base plate 10 is an anchor pin 14 which is mounted on a slidably adjustable micrometer carriage 16. Several such anchor pins of various sizes are available. Mounted to the left central portion of the base plate 10 is an outside diameter locating post 18 similarly mounted on its own slidable micrometer carriage 20. A distance indicating meter 22, for measuring brake lining clearance and interference is also mounted on the base plate 10. Two such meters are normally preferred. A center post 24 is mounted in a bore in the central right portion of the base plate 10. FIG. 1 also shows a brake shoe 26 mounted on the gage for measurement.

FIGS. 2 through 5 show the structures illustrated in FIG. 1 in more detail. The base plate 10, as seen best in FIGS. 2 and 3, is a rectangular flat plate having several bores and slots cut perpendicularly through the plate. As best seen in FIG. 3, a radially aligned series of anchor bores 30A–30E are provided in the base 10 for positioning the anchor pin 14 in a selected position. A series of outside diameter locater bores 32A–32E, best viewed in FIG. 2, are aligned along a radius which is perpendicular to the radius of alignment of the anchor bores 30A–30E. These locater bores 32A–32E are used to selectively position the outside diameter locating post 18 in a manner to be described. The spacing between the bores 30A–30E and between the bores 32A–32E is dependent upon the range of travel of the micrometers of the carriages 16 and 20. They must be close enough to permit a continuum of positions. The base 10 also has a series of arcuately spaced, radial slots such as slots 35 and 36 at selected angular intervals on opposite sides of the outside diameter locater bores 32A–32E. These radial slots are used for slidably mounting the meter 22 in selected slots to permit radial adjustment. Preferably, six slots are spaced at 10° intervals on each side of the locater bores 32A–32E. A cut-out is provided in the upper right corner of the base 10. The cut-out has a linear reference surface 38. The reference surface 38 is aligned on that diameter of the simulated brake drum which extends through the center post 24 and the radially aligned anchor bores 30A–30E. A pair of support leg bores 40 and 42 are provided in the base 10 for snug receipt of the legs of the supporting leg structure 12.

The center post 24 is seen best in FIG. 6 and comprises a lower shank portion 44 and an upper cylindrical portion 46 of smaller diameter. A slidable collar 48 is frictionally engaged on the upper portion 46. The center post 24 is mounted to the base plate 10 with its threaded screw portion 27 inserted in a hole and is clamped to the base plate 10 by a nut 25 engaged on its screw portion 27. The center of the center post is at a position simulating the center of a standard brake drum.

The anchor pin 14 is a cylindrical rod mounted to a micrometer carriage 16. Anchor pins of various sizes are available, typically 0.622 – 0.812 inches in diameter, to correspond to the anchor pin sizes of various standard brake mechanisms. The micrometer carriage 16 comprises an upper slide 50 mounted on a base member 52. The slide 50 has a dovetail tongue 54 which is slidably received in a mating groove in the base member 52 and may be locked in its adjusted position by a tension clamp 51. A micrometer 56 is clamped in the base member 52 by a screw 57 in order to permit accurate adjustment of the anchor pin 14 to a desired radial distance from the center of the center post 24. The base member 52 of the micrometer carriage 16 is bolted by a bolt 58 in a selected one of the radial series of anchor bores 30A–30E.

The outside diameter locater means 18 is preferably a cylindrical shaft mounted to a similar micrometer carriage 20. However, the shape or size of the locater means is unimportant. It need only have a surface which can seat against the brake lining. The micrometer carriage 20, like the micrometer carriage 16, comprises a slide 60 and a base member 62. The dove-tail tongue 64 of the slide 60 is received in a mating groove in the base member 62 and is slidably adjusted by means of a micrometer screw 66. The slide 60 is fixed in its adjusted position by a tension clamp 55. A guide pin 68 is provided in the bottom of the base member 62 for insertion in one of the radial series of locater bores 32A-32E. A bolt 69 extends through the base plate 10 into a threaded bore in the bottom of the base member 62 for attaching the micrometer carriage 20 to the base 10. The anchor pin micrometer carriage 16 is also provided with a similar guide pin not shown. The outside diameter locating means 18 has a surface 70 extending through the test plane for seating against the brake shoe lining at a position simulating and corresponding to a standard initial contact point of the shoe on the simulated brake drum.

The distance indicating meter 22 is mounted on its support 72 radially outwardly from the center of the simulated drum. It has a radially operable sensing member 74 seatable against the shoe lining and indicates the radial distance from a calibrated drum radius of the simulated standard brake drum to the shoe liner. The support 72 has a base member 76 which is attached to the base by a screw 78 extending through one of the radial slots. A vertically aligned channel guide 80 extends upwardly from the base plate 76 and receives a bracket 82 to which the meter 22 is attached. The bracket 82 is slidable along the channel 80 and may be fixed at a selected height by tightening the screw 84. This also allows clearance checks across the width of the shoe. In actual practice, it is advantageous to have two such meters mounted in different ones of the radial slots. Preferably, the two meters are mounted at equal angles on opposite sides of the locater post 18. A second such meter, 22A, is shown in phantom in FIG. 5. This would permit simultaneous measurement of clearance or interference on both sides of the center contact point at the locater post 18.

The assembly and adjustment of the gage are sequentially illustrated in FIGS. 2, 3, 4, and 5. The base 10 with its attached stand 12 is initially positioned on a work surface with the base 10 in the oblique position illustrated in FIG. 1. The center post 24 is then bolted into its position on the base 10. The operator must now determine the standard brake mechanism dimensions for the brake shoe to be tested. For this purpose, he is provided with tables in which these standard dimensions are tabulated for each shoe which might be tested. The micrometer carriage 16, which carries the desired anchor pin 14, is then mounted to particular anchor bores. The particular anchor bores are selected so that, initially, the anchor pin 14 is spaced from the center of the center post 24 a distance which is nearest the standard distance indicated in the table, between the anchor pin and the center of the corresponding actual brake mechanism.

The operator is provided with several anchor setting bars such as the anchor setting bar 90 illustrated in FIG. 2. Each anchor bar has a V-slot at one end and a cylindrically shaped measuring surface at its opposite end for properly spacing the anchor pin 14 from the center post 24. The operator selects the proper anchor setting bar and, radially aligning it on the gage, seats the V-slot end 91 against the center post 24 and the opposite end 92 near the anchor pin 14. The anchor bar 90 which is selected will have an effective length for spacing the anchor pin a standard distance from the center of the center post 24. The micrometer screw 56 is then rotated until the anchor pin 114 seats against the end 92 of the anchor setting bar 90. In case of overtravel, the slide must be returned by hand and reset. The slide is fixed in this position by tightening the tension clamp 51. The anchor setting bar 90 is then removed from the assembly. If no bar is provided for a particular spacing, a bar of the next largest length may be used and the micrometer scale of the micrometer screw 56 can be used to obtain the proper spacing.

FIG. 3 illustrates the positioning of the outside diameter locating means 18. Although the anchor pin 14 and its micrometer carriage 16 are shown removed from FIG. 3 in order to reveal the anchor bores 30, in actual practice these members would remain fixed in their position on the base 10 while the outside diameter locater means 18 is being adjusted. The micrometer carriage 20, which carries the outside diameter locater means 18, is attached to the base 10 at the particular outside diameter locater bores which position the locater means 18 at a radial distance from the center of the center post 24 which is initially closest to the standard radius for the corresponding standard brake drum as shown in the table. The operator is provided with a set of several drum radius setting bars, each corresponding to a standard drum radius for various brake mechanisms. The operator selects the particular drum radius setting bar 100 for use with the brake shoe to be measured, and seats the V-slot end 102 of the setting bar 100 against the center post 24 resting below the collar 48. The drum radius setting bar is radially aligned and has an opposite end cylindrical surface 104 which is spaced a standard drum radius from the center of the center post 24. This surface is used for calibrating the outside diameter locater means 18. The micrometer screw 66 is now turned until the locater means 18 seats against the end 104 of the drum radius setting bar 100. The slide 60 is now clamped in this position by means of its tension clamp 55. The drum radius setting bar 100 is then removed so that the anchor pin 14 and the outside diameter locater means 18 are fixed in position as illustrated in FIG. 4.

The meter 22 is calibrated to the standard drum radius also by use of the drum radius setting bar 100. The brake shoe 26, which is to be tested, should temporarily be positioned on the gage as illustrated in FIG. 5. The base member 72 for the meter 22 is positioned in a selected one of the radial slots at the angular position at which measurement of clearance or interference is desired such as the end position of the lining on a shoe. The vertical height of the sensing member 74 of the meter 22 is now adjusted to any desired point across the width of the lining but normally at approximately the center point of the brake lining 110 by sliding the bracket 82 along the channel guide 80. It is fixed at the proper height by tightening the screw 84. The brake shoe 26 is then removed and the drum radius setting bar 100 is radially aligned on the gage as illustrated in FIG. 4, seating as before at one end against the center post 24 on collar 48 and at its opposite end against the sensing member 74. The collar 48 is slid to the proper height so that the radius setting bar 100 can rest on the collar at the same height as the sensing member 74. The base member 76 is then slid along the slot until the indicator of the meter 22 is depressed an amount sufficient to exceed the clearance to be measured which might be roughly 0.030 inches. The base member 76 is then tightened against the base 10 by a bolt 78. The indicator dial is then adjusted to read 0, which corresponds to the interior surface of a simulated standard brake drum. The same is done with the second meter 22A shown in phantom in FIG. 5.

The brake shoe 26 is reinserted on the gage with the anchor eye 15 resting against the anchor pin 14 and the exterior surface of the brake lining 110 resting against the locater means 18. It can be seen that, because of the angular orientation of the base 10 and the positioning and orientation of the micrometer carriages 16 and 20, the gravitational forces exerted by the brake shoe 26 on these micrometer carriages will maintain the slide members 50 and 60 of the micrometer carriages 16 and 20 firmly seated against their micrometer screws 56 and 66. Also a uniform force holds the shoe against the locater post 18. With the brake shoe in its proper position, the reading of the meter will now indicate the clearance or interference between the brake lining surface and the standard brake drum diameter.

If the operator is confronted with a brake shoe with an anchor eye that has been bent open in use, he can measure the effect of this looseness or clearance or interference by merely moving the enlarged eye from side to side along the anchor pin 14 and observing the measured changes at the meters 22 and 22A.

If he wishes to measure the effect that a dimensional change of the position of one part has on the clearance or interference, he simply moves the corresponding part and measures the difference.

It should be noted that it would be possible, though not as flexible or universal, to provide an anchor pin and meter and locating means which are inserted directly in series of bores in the base 10. This would, of course, permit no adjustment of the gage. Furthermore, many other types of carriages might instead be used for the slidable adjustment of the anchor pin, the locating means, and the meter.

It should furthermore be noted that the point of initial contact between the brake lining and the brake drum in a brake mechanism ordinarily is intended to occur along a radius which is perpendicular to a radius extending through the anchor pin. Therefore, I have correspondingly positioned the locater means 18 along this radius. How-ever, an equivalent and obvious modification would be easily made by making minor modifications in the base 10 so that the micrometer carriage 20 for the locater means 18 could be located along any radius at which initial contact occurs for a particular brake mechanism.

It is to be understood that while the detailed drawings and specific examples given describe preferred embodiments of my invention, they are for the purposes of illustration only, that the apparatus of the invention is not limited to precise details and conditions disclosed, and that various changes may be made therein without departing from the spirit of the invention which is defined by the following claims.

I claim:

1. A brake lining gage for supporting a brake shoe in a test plane for measurement of clearances and interferences between a simulated standard brake drum and the lining of the shoe, the gage comprising:
   a. a base;
   b. an anchor pin mounted to the base and extending through and perpendicular to the test plane for seating against the anchor eye of the brake shoe at a position simulating the anchor pin of a brake mechanism;
   c. an outside diameter locater means movably mounted to the base for radial adjustment the locater means having a locating surface extending through the test plane, for seating against the lining at a position simulating and corresponding to a standard initial contact point for the shoe lining and the drum;
   d. a distance indicating meter mounted to the base radially outwardly from the center of the simulated drum and having a radially operable sensing member seatable against the shoe lining for indicating the radial distance from a simulated drum to the shoe liner;
   e. a center post mounted to the base, extending through and perpendicular to the test plane and spaced from the anchor pin at a position simulating the center of the standard brake drum; and
   f. a drum radius setting bar for seating at one end against the center post and in radial alignment, and seating at its opposite end against the outside diameter locater means, the drum radius setting bar having an opposite end surface spaced a standard drum radius from the center of the center post, for calibrating the outside diameter locator means to the standard drum radius;
   wherein the meter may be calibrated to the standard drum radius, a brake shoe positioned on the gage with its anchor eye seated against the anchor pin and its lining seated against the locator means, and the meter sensing member can then indicate the clearance or interference between the drum and the shoe lining.

2. A brake lining gage for supporting a brake shoe in a test plane for measurement of clearances and interferences between a simulated standard brake drum and the lining of the shoe, the gage comprising:
   a. a base;
   b. an anchor pin movably mounted to the base for radial adjustment and extending through and perpendicular to the test plane for seating against the anchor eye of the brake shoe at a position simulating the anchor pin of a brake mechanism;
   c. an outside diameter locator means mounted to the base, the locator means having a locating surface extending through the test plane, for seating against the lining at a position simulating and corresponding to a standard initial contact point for the shoe lining and the drum;
   d. a distance indicating meter mounted to the base radially outwardly from the center of the simulated drum and having a radially operable sensing member seatable against the shoe lining for indicating the radial distance from a simulated drum to the shoe liner;
   e. a center post mounted to the base, extending through and perpendicular to the test plane and spaced from the anchor pin at a position simulating the center of the standard brake drum; and
   f. an anchor setting bar for radial alignment and for seating at one end against the center post and for seating at its opposite end against the anchor pin, the anchor bar having an effective length for spacing the anchor pin a standard distance from the center of the center post wherein the meter may be calibrated to the standard drum radius, a brake shoe positioned on the gage with its anchor eye seated against the anchor pin and its lining seated against the locator means, and the meter sensing member can then indicate the clearance or interference between the drum and the shoe lining.

3. A brake lining gage for supporting a brake shoe in a test plane for measurement of clearances and interferences between a simulated standard brake drum and the lining of the shoe, the gage comprising:
   a. a base;
   b. an anchor pin movably mounted to the base for radial adjustment and extending through and perpendicular to the test plane for seating against the anchor eye of the brake shoe at a position simulating the anchor pin of a brake mechanism;
   c. an anchor setting bar for seating at one end against the center post and for seating at its opposite end against the anchor pin in radial alignment, the anchor bar having an effective length spacing the anchor pin a standard distance from the center of the center post;
   d. an outside diameter locator means movably mounted to the base for radial adjustment the locator means having a locating surface extending through the test plane, for seating against the lining at a position simulating and corresponding to a standard initial contact point for the shoe lining and the drum;
   e. a distance indicating meter movably mounted to the base for radial adjustment radially outwardly from the center of the simulated drum and having a radially operable sensing member seatable against the shoe lining for indicating the radial distance from a simulated drum to the shoe liner;
   f. a drum radius setting bar for seating at one end against the center post in radial alignment the drum radius setting bar having an opposite end surface spaced a standard drum radius from the center of the center post, for seating against the sensing member of the meter for calibrating the meter to the standard drum radius and
   the drum radius setting bar is also provided for seating at one end against the center post in radial alignment, and seating at its opposite end against the outside diameter locator means for calibrating the outside diameter locator means to the standard drum radius; and
   g. a center post mounted to the base, extending through and perpendicular to the test plane and spaced from the anchor pin at a position simulating the center of the standard brake drum;

wherein the meter may be calibrated to the standard drum radius, a brake shoe positioned on the gage with its anchor eye seated against the anchor pin and its lining seated against the locator means, and the meter sensing member can then indicate the clearance or interference between the drum and the shoe lining.

4. A brake lining gage for supporting a brake shoe in a test plane for measurement of clearances and interferences between a simulated standard brake drum and the lining of the shoe, the gage comprising:
   a. a base having
      a radially aligned series of anchor bores for selectively positioning an anchor pin and
      series of outside diameter locator bores aligned along a radius perpendicular to the radius of alignment the anchor bores for selectively positioning a locator means
   b. an anchor pin mounted to the base and extending through and perpendicular to the test plane for seating against the anchor eye of the brake shoe at a position simulating the anchor pin of a brake mechanism;
   c. an outside diameter locator means mounted to the base, the locator means having a locating surface extending through the test plane, for seating against the lining at a position simulating and corresponding to a standard initial contact point for the shoe lining and the drum; and
   d. a distance indicating meter mounted to the base radially outwardly from the center of the simulated drum and having a radially operable sensing member seatable against the shoe lining for indicating the radial distance from a simulated drum to the shoe liner;

wherein the meter may be calibrated to the standard drum radius, a brake shoe positioned on the gage with its anchor eye seated against the anchor pin and its lining seated against the locator means, and the meter sensing member can then indicate the clearance or interference between the drum and the shoe lining.

5. A brake lining gage for supporting a brake shoe in a test plane for measurement of clearances and interferences between a simulated standard brake drum and the lining of the shoe, the gage comprising:
   a. a base;
   b. an anchor pin mounted to the base and extending through and perpendicular to the test plane for seating against the anchor eye of the brake shoe at a position simulating the anchor pin of a brake mechanism;
   c. an outside diameter locator means mounted to the base, the locator means having a locating surface extending through the test plane, for seating against the lining at a position simulating and corresponding to a standard initial contact point for the shoe lining and the drum; and
   d. a distance indicating meter mounted to the base radially outwardly from the center of the simulated drum and having a radially operable sensing member seatable against the shoe lining for indicating the radial distance from a simulated drum to the shoe liner; wherein a series of arcuately spaced radial slots are provided at a selected angular intervals on opposite sides of the outside diameter locator means for slidably mounting the meter to a selected slot wherein the meter may be calibrated to the standard drum radius, a brake shoe positioned on the gage with its anchor eye seated against the anchor pin and its lining seated against the locator means, and the meter sensing member can then indicate the clearance or interference between the drum and the shoe lining.

6. A gage according to claim 5, wherein
a. a radially aligned series of anchor bores are provided in the base for selectively positioning the anchor pin;
b. a series of outside diameter locator bores are provided in the base and aligned along a radius perpendicular to the radius of alignment of the anchor bores, for selectively positioning the locator means; and
c. a center post is matingly mounted in a center bore in the base and spaced from the anchor pin at a distance simulating the center of a standard brake mechanism.

7. A gage according to claim 6, wherein
a. the meter is movably mounted to the base for radial adjustment;
b. the outside diameter locating means is movably mounted to the base for radial adjustment;
c. a drum radius setting bar is provided for seating at one end against the center post in radial alignment, the drum setting bar having an opposite end surface spaced a standard drum radius from the center of the center post, for seating at its opposite end against the outside diameter locater means and the meter for calibrating them to the standard drum radius;
d. the anchor pin is movably mounted to the base for radial adjustment; and
e. an anchor setting bar is provided for seating at one end against the center post in radial alignment and for seating at its opposite end against the anchor pin, the anchor bar having an effective length spacing the anchor pin a standard distance from the center of the center post.

8. A gage according to claim 7, wherein
the base is mounted to a stand for aligning the test plane transverse to a horizontal work table with the anchor pin relatively beneath the center post.

* * * * *